Jan. 13, 1925. 1,522,565
C. F. WHITMAN
GRIP NUT AND METHOD OF MAKING THE SAME
Filed Oct. 21, 1921  2 Sheets-Sheet 1
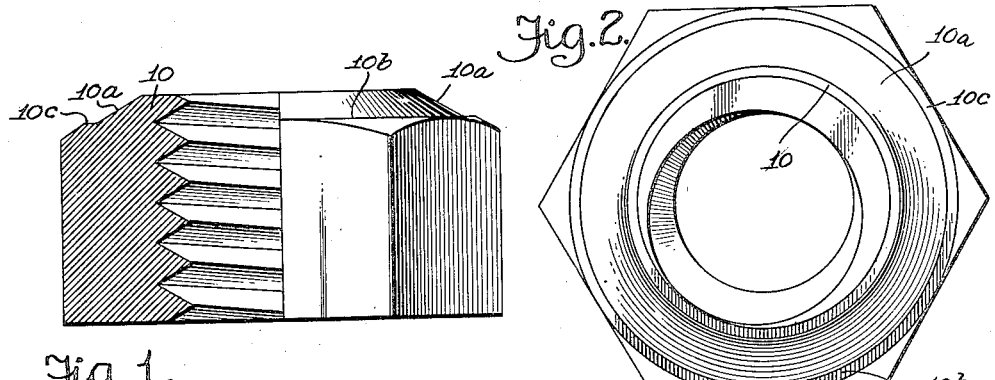
Fig. 1. Fig. 2.
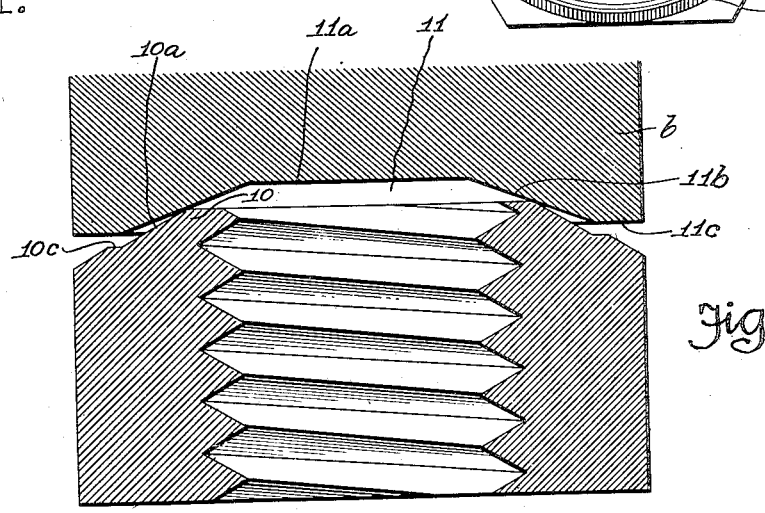
Fig. 3.
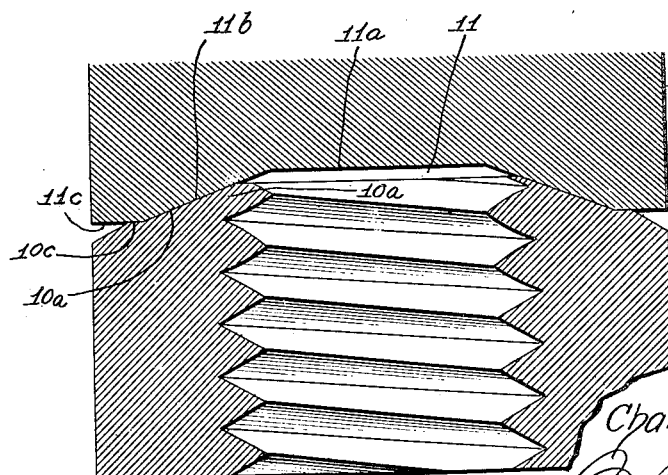
Fig. 4.
Inventor
Charles F. Whitman,
By
Attorneys Jan. 13, 1925.                                                    1,522,565
                         C. F. WHITMAN
            GRIP NUT AND METHOD OF MAKING THE SAME
                  Filed Oct. 21, 1921        2 Sheets-Sheet 2
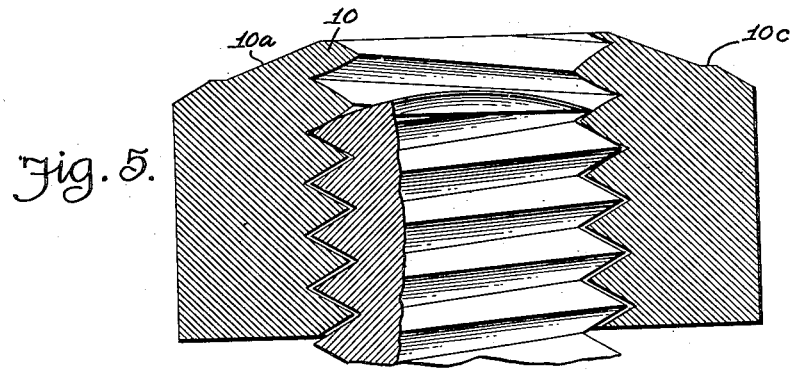
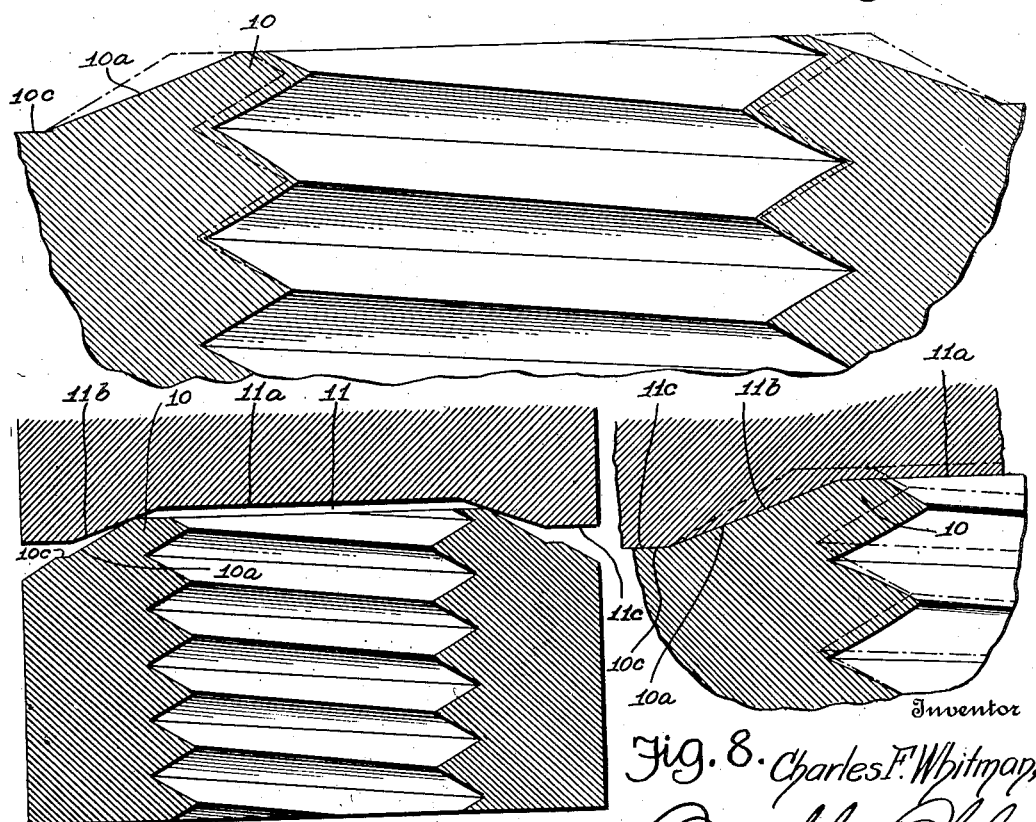

Patented Jan. 13, 1925.

1,522,565

UNITED STATES PATENT OFFICE.

CHARLES F. WHITMAN, OF DETROIT, MICHIGAN, ASSIGNOR TO AUTOMATIC PRODUCTS CO., OF DETROIT, MICHIGAN, A CORPORATION OF MICHIGAN.

GRIP NUT AND METHOD OF MAKING THE SAME.

Application filed October 21, 1921. Serial No. 509,439.

*To all whom it may concern:*

Be it known that I, CHARLES F. WHITMAN, a citizen of the United States, of America, residing at Detroit, in the county of Wayne and State of Michigan, have invented certain new and useful Improvements in Grip Nuts and Methods of Making the Same, of which the following is a specification, reference being had therein to the accompanying drawings.

This invention relates to improvements in the art of nut gripping devices, and more particularly to devices wherein the gripping or locking action is produced by the threads of the nut.

Various attempts have been made to produce a nut formation which will set up locking conditions by threading the nut upon the bolt with which it cooperates. Many of these involve the mutilation or distortion of the threads of the nut or bolt, in some way or other, in order to produce an increase in the friction value between the threads of the bolt and nut. Some of these involve the mutilation of the threads after the nut is placed in position—as by the use of a special tool or by the action of threading the nut, thus tending to permit the threads of the bolt or nut, as the case may be, to serve as a thread developing structure to set up the friction value. Other ways have been to produce a finished nut having this thread distortion idea, some employing this in connection with a few of the threads only to permit free running of the nut during a portion of the threading movement, activity of the locking feature taking place after the threading action has been had.

The present invention pertains more particularly to this latter type of devices, the nut having a threaded zone of normal thread pitch and an additional zone in which the thread pitch varies from such normal in the length of the pitch.

Heretofore it has been contemplated to provide an additional zone for this purpose by varying the pitch at one or more points in the circumferential length of the thread by the application of pressure on a nut portion in such manner as to provide pressure in the direction of the thread axis at points corresponding to such points, thus tending to set up conditions of spaced or isolated distortion. In such structures however, the nut is required to be of more or less special form generally forged or rolled, thus providing for a number of independent stages of operation with resultant increase in cost of manufacture. And where the structure is such as to tend to set up distortion throughout the length of a thread, the distortion is not uniform or progressive in development, the result being that the nut quickly loses its gripping possibilities in so far as removal and replacement is concerned, the distortion disappearing after the nut has been used a few times in connection with successive installations.

The present invention is designed to produce a nut wherein the gripping zone is of a substantially progressive development, more or less uniform in characteristic so that while the variation is relatively small between spaced points in the direction of the length of the thread, this variation continues more or less uniformly towards the outer end of this distortion zone, so that the total distortion is at least sufficient to provide the locking activity; as a result the friction value is of progressively-increasing character, while the arrangement tends to retain this configuration due to the fact that the distortion variation is distributed within a relatively long distance instead of a short distance; with the short distance the thread is subjected to heavy pressure in being threaded and tends to reduce the distortion effect— the cause of the loss of distortion value after the nut has been removed and replaced a few times; on the contrary, the small variation extending over a long distance applies the pressure gradually without tending to set up the conditons of flow of metal.

Another feature of the invention is the ability to produce the nut at greatly reduced cost, the embryo blank being capable of production by the use of automatic screw machines, the configuration of the blank being such that by the use of a pressure die active on the nut in simple manner will provide the complete nut formation ready for application to service conditions.

To these and other ends, therefore, the nature of which will be readily understood as the invention is hereinafter disclosed, said invention consists in the improved nut construction and the methods of producing the same, hereinafter more fully described, illustrated in the accompanying drawings, and more particularly pointed out in the appended claims.

In the accompanying drawings, in which similar reference characters indicate similar parts in each of the views:—

Figure 1 is a view of a nut in its embryo blank form, the view being partly in section and partly in elevation;

Fig. 2 is a top plan view of the same;

Fig. 3 is a sectional view of a nut according to Fig. 1 with a distorting die in position to produce the thread distortion;

Fig. 4 is a view similar to Fig. 3 with the die in its final position of operation with the thread distorted;

Fig. 5 is a view of the nut of Fig. 4 partially applied to a bolt;

Fig. 6 is an enlarged view of the distortion zone of a nut treated as in Figs. 3 and 4, the view indicating approximately the change made by the action of the die, the view being on an enlarged scale;

Fig. 7 is a view of the type of Fig. 3, showing a die of slightly different configuration, and Fig. 8 is a fragmentary view showing the approximate effect of the use of the die of Fig. 7.

The embryo nut shown in Figs. 1 and 2 differs mainly from the ordinary nut produced on automatic screw machines, in that the body carries a projecting portion 10 which has a conical outer face 10$^a$, the portion of greatest diameter being at the point where it joins the body of the nut. The angle of taper of this face 10$^a$ may vary, but I prefer it to be approximately 40° from the horizontal represented by the base line 10$^b$ of the nut. The blank is threaded throughout the length of both body and projecting portion, the thread pitch being uniform throughout. And I prefer the upper or outer plane face of the projecting portion to have an outside diameter slightly greater than that of the root of the tooth, although it may be of equal length with the root diameter, the greater length ensuring that the root of the final thread does not reach the face 10$^a$. The thickness of the annulus at the outer end of the projecting portion 10 may be equal to the thread pitch or less or greater than such length as may be desired; this will be understood from the fact that the thread extends to the outer end of the annulus, but, owing to the helical character of the thread, the plane face of the end of the annulus will intersect different portions of the thread, so that the thickness of the annulus at such end will vary, as indicated, for instance, in Fig. 2. This with the angle of taper of face 10$^a$ provides for a rather extended thickness of metal on the plane of the base of the projecting portion, this thickness decreasing in accordance with the taper; it is approximately uniform, the variation being provided by the thread itself, the outer face 10$^a$ being of uniform taper.

While not absolutely required, I prefer to provide an annular land 10$^c$ at the base of the projecting portion, the land acting as a stop for the die during the distorting operation. Obviously, if the top face of the body of the nut extends on a single plane, such face will serve the purpose of the land.

In the drawings, two forms of the die are shown, Figs. 3 and 4 illustrating one form, Figs. 7 and 8 another form. The difference between the two forms is in the depth of the bottom of the die recess.

In each form the recess 11 of the die —b— is conical or rather frusto-conical in contour, the bottom 11$^a$ preferably, although not necessarily, extending on a single plane, the tapered face 11$^b$ leading to the outer plane of the die, the latter being indicated at 11$^c$. The principal feature of the recess is the angle of the taper, this differing from that of taper face 10$^a$, being preferably of a less angle to the horizontal than is face 10$^a$, the difference approximating 10°, although this may vary to meet the individual conditions. For instance, if face 10$^a$ is at a 40° angle, face 11$^b$ would be approximately 30° to the horizontal.

As a result of this difference, the projecting portion of the nut will, in presence of movement of the die in the direction of the thread axis, apply pressure upon such portion, the pressure being applied first to that part of annulus 10 of least diameter, and therefore of least thickness, this being indicated in Fig. 3; hence, pressure is applied to that portion of the annulus having the lowest amount of resistance to such pressure, so that a flow of metal may begin tending to decrease the thread diameter at this point by crowding the metal toward the thread axis from all points of the annulus circumference on the outer plane. As the pressure increases the zone of contact of annulus and die increases in width, bringing in portions of greater resistance due to increasing thickness of the annulus, so that the flow is increased in amount inwardly but more or less uniformly. This continues until the outer face of the die reaches the land 10$^c$ which completes the pressure activity.

The difference between the two forms of dies is in the position of bottom 11$^a$, the form of Fig. 3 locating this face at a point where it is inactive in the pressure aplication, whereas the form of Fig. 7 has it so located as to become active during the latter portion of the pressure action, thus adding to the action of face 11$^b$ the action of face 11$^a$ on the annulus.

In Fig. 6 I have shown somewhat of the effect produced by the die of Fig. 3, the dotted lines indicating the embryo formation and the full lines the completion of the pressure application. This is shown exaggerated, and while it does not disclose any material variation in the length of the thread pitch, there has been found to be a small change in this respect in the direction of decrease, the amount, however, being slight, the major portion of the change being in the decrease in length of the apex diameter of the thread, this decreasing progressively and approximately uniformly from a point generally beyond the completed end thread and which may extend over two or three threads as shown. The drawings, obviously, do not show the exact configuration, it being readily understood that the flow of metal is not uniform throughout the annlus due to the V-shape of the threads, so that the thickness of the metal at the point of pressure application varies. This will be understood by comparing the thickness of metal at the two sides of Fig. 6, so that resistance to flow may vary.

While the pressure exerted by the die is in the direction of the thread axis, the initial pressure is applied simply at the inner and upper edge of the annulus 10; since this portion of the annulus is at the portion of greatest thickness of the nut, it will be readily understood that the flow of metal set up would be in the direction of lesser resistance, and this would be generally in the direction toward the thread, since any tendency to flow outward instead of inward would be in a direction which is in the path of travel of another portion of the die, the action of which would be to cause the metal to flow in the reverse direction. As the pressure on the die increases, the length of contact of the die face with the annulus increases until the die comes to rest upon the land 10°, at which time the tapered face of the annulus has been changed from the angle of the embryo nut to the angle provided by the die.

As will be seen the action of the die is thus progressive on the annulus and in the direction of general increase in thickness of the annulus, this of course being true proximately for the reason that the conditions set up by the thread provide for variations in thickness represented by the depth of a thread. However, each part of the tapered face of the annulus on a plane intersecting the thread axis at right angles and which extends through the annulus is in contact with the die throughout the circumference of the annulus at such plane, the result being that the pressure exerted is exerted substantially uniformly throughout the periphery of the annulus and hence the flow of metal inwardly is substantially uniform excepting possibly the variation which might be produced because of the lesser resistance to flow set up by the variations in thickness of the annulus on such plane produced by the thread formation.

There is thus set up a zonal formation at the outer end of the nut within which the threads have been changed by the action of the die, this change tending to vary some of the characteristics of the thread in such manner that the threads of a bolt introduced into the opposite end of the nut and freely movable in such opposite end will set up a binding action on the threads within this zonal portion, the change being more or less progressive toward the outer end of the thread, with the rate of change comparatively small, so that the threading of the bolt will tend to set up an extended length of contact between threads of the two parts so that the locking pressure and friction becomes distributed along the length of the thread to a substantially increasing extent; it is, of course, not possible to give the exact result that is produced at this time, and it is possible that slight variations from a true uniform increase will be provided, but these variations are comparatively small. While it is not possible to state the exact formation produced, it is clearly evident that the deformation zone of the thread produced in this manner is of a radically different characteristic from a zone wherein the pressures are applied at spaced apart points and thus set up conditions of an irregular deformation type.

Where the die of Fig. 7 is employed, the change made within the deformation zone differs from that just described because of the fact that the bottom of the die—inactive in the formation of Fig. 3—becomes active during the latter part of the pressure application, thus adding to the flow of metal characteristic set up by the die of Fig. 3, that produced by the application of pressure in the direction of greatest resistance, the direction which corresponds to the axis of the nut, the result being that there is the added effect set up of compressing the metal of the annulus, this, due to the fact that the annulus is of increased thickness toward its base, being less resistant at the portion of least diameter of the annulus than at the base, so that there is not only set up a condition which would tend to reduce the distance between the apices of adjacent teeth within the zone, but this change would be more or less progressive in the direction of approach to the outer end of the thread, thus tending to preserve this general idea of setting up a zone of deformation in which the increase of resistance to passage of the bolt thread gradually increases as the bolt is advanced into the zone, with the increase being at a comparatively low rate.

As a result, when the nut is threaded on to the bolt, it first runs freely and then, as the zone of deformation is reached further movement brings into activity the effects of the zone, the resistance to movement of the nut increasing as the zone is traversed, finally developing a resistance sufficient to practically prevent further movement. Since the locking effect is presented substantially continuously along the length of a thread, there is less likelihood of the bolt thread serving to materially change the thread formation within the zone; consequently, if the nut is removed, its threaded zone is not materially damaged and will again become efficiently locked when replaced. Should there be a slight change, the threading movement of the nut would simply carry it further onward and bring into play the characteristics of that portion of the thread which had not been reached during the positioning of the nut in the prior operation.

The advantages above pointed out result from the particular characteristics of the annulus and die formation. There are additional advantages, however, presented in connection with a nut having these characteristics, these additional advantages flowing more particularly from the manufacturing point of view.

As will be seen, the annulus is of circular contour, and hence is capable of being turned. As a result, the embryo nut is capable of being produced on automatic screw machines, it being possible to produce such embryo nut from a rod or tube in which the periphery on a cross section on the rod or tube corresponds to that of the nut proper, the land and annulus being produced by a turning operation and the embryo nut severed from the rod or pipe which forms the source of supply. If of rod form, the opening for the thread is produced, after which the threading action takes place, the thread extending entirely through the nut; if of pipe formation, the opening within the pipe becomes the threaded portion by the use of a threading tool.

The embryo nut is then subjected to the action of the die which, as above explained sets up the zone of deformation to complete the nut.

Both operations may be more or less automatic if desired, thus decreasing labor cost; however, where the production is not automatic in its entirety, it will be readily understood that its cost will be comparatively low, since there is no finishing action required after the nut has been given a die action. The bolt has been thoroughly tested and has been found especially efficient not only as a nut which will provide the characteristics of a gripping nut when applied for the first time, but which will, be efficient when it is reused for a large number of times.

While I have herein shown and described one or more embodiments of the present invention, and methods by which these can be produced in a simple and efficient manner, it will be readily understood that modifications and changes therein may be found desirable or essential in meeting the exigencies of use, and I desire to be understood as reserving the right to make any and all such changes therein as may be found desirable or necessary in so far as the same may fall within the principles and scope of the invention as expressed in the accompanying claims when broadly construed.

What I claim is:—

1. In the art of producing gripping nuts, the method which consists in producing an integral embryo nut formation having a body and annulus with the annulus symmetrically disposed relative to the thread axis and with the annulus having an external tapered face with the planes of maximum and minimum diameters of the face extending at right angles to the thread axis and spaced apart in parallel relation a distance such that a cross section of the annulus will present such face at an acute angle to the plane of maximum diameter, the body and annulus of the embryo formation being threaded by a continuous thread of uniform pitch with the depth of the threads of the annulus portion equal to those of the body portion, and then subjecting the embryo nut to pressure exerted in the direction of the thread axis and made active progressively on such tapered face in the direction of increasing diameter of the annulus and substantially throughout the length of such face in the absence of a support for the threads to produce in such threaded portion a zone wherein the thread is varied from the normal with the variations of increasing value in the direction of approach to the plane of minimum diameter of the annulus.

2. In the art of producing gripping nuts, the method which consists in producing an integral embryo nut formation having a body and annulus with the annulus symmetrically disposed relative to the thread axis and with the annulus having an external tapered face with the planes of maximum and minimum diameters of the face extending at right angles to the thread axis and spaced apart in parallel relation a distance such that a cross section of the annulus will present such face at an acute angle to the plane of maximum diameter, the body and annulus of the embryo formation being threaded by a continuous thread of uniform pitch, with the depth of the threads of the annulus portion equal to those of the body portion, and then subjecting the embryo nut to pressure exerted in the direction of the thread axis and made active progressively on such tapered face in the direction of increasing diameter of the annulus and substantially throughout the length of such face in the absence of a support for the threads to produce in such threaded portion a zone of thread variation from the normal, with the variation manifested in a decrease in diameter of threads within the zone, such decrease being substantially progressive in the direction of approach to the plane of minimum diameter of the annulus.

3. In the art of producing gripping nuts, the method which consists in producing an integral embryo nut formation having a body and annulus with the annulus symmetrically disposed relative to the thread axis and with the annulus having an external tapered face with the planes of maximum and minimum diameters of the face extending at right angles to the thread axis and spaced apart in parallel relation a distance such that a cross section of the annulus will present such face at an acute angle to the plane of maximum diameter, the body and annulus of the embryo formation being threaded by a continuous thread of uniform pitch, with the depth of the threads of the annulus portion equal to those of the body portion, and then subjecting the embryo nut to pressure exerted in the direction of the thread axis made active progressively on such tapered face in the direction of increasing diameter of the annulus and substantially throughout the length of such face, in the absence of a support for the threads to produce in such threaded portion, a zone of thread variation from the normal, with the variation manifested in a decrease in diameter of threads within the zone, and by a decrease in the pitch length of such threads, such decrease being substantially progressive in the direction of approach to the plane of minimum diameter of the annulus.

4. In the art of producing gripping nuts, the method which consists in producing an integral embryo nut formation having a body and annulus with the annulus symmetrically disposed relative to the thread axis and with the annulus having an external tapered face with the planes of maximum and minimum diameters of the face extending at right angles to the thread axis and spaced apart in parallel relation a distance such that a cross section of the annulus will present such face at an angle to the plane of maximum diameter not materially greater than 45°, the body and annulus of the embryo formation being threaded by a continuous thread of uniform pitch, with the depth of the threads of the annulus portion equal to those of the body portion, and then subjecting the embryo nut to pressure exerted in the direction of the thread axis and made active progressively on such tapered face in the direction of increasing diameter of the annulus and substantially throughout the length of such face in the absence of a support for the threads to produce in such threaded portion a zone wherein the thread is varied from the normal with the variations of increasing value in the direction of approach to the plane of minimum diameter of the annulus.

5. In the art of producing gripping nuts from an embryo nut formation having a threaded body and annulus, with the annulus projecting from the body and having a symmetrical configuration relative to the thread axis, the projected length of the annulus presenting a tapered face decreasing in dimension away from the body, the thread being of uniform pitch and depth throughout the length of the formation, the method of treating such embryo formation to produce the grip nut which consists in applying a pressure to the taper face of the annulus exerted in the direction of thread axis in the absence of a support for the threads, with the contact of pressure-applying instrumentality and taper face increasing progressively in area of contact in the direction of increasing diameter and substantially throughout the length of the taper, to produce a thread zone wherein the thread is varied from the normal in an increasing progression toward the projected end of the annulus.

6. In the art of producing gripping nuts from an embryo nut formation having a threaded body and annulus, with the annulus projecting from the body and having a symmetrical configuration relative to the thread axis, the projected length of the annulus presenting a tapered face decreasing in dimension away from the body, the thread being of uniform pitch and depth throughout the length of the formation, the method of treating such embryo formation to produce the grip nut which consists in applying pressure to the projected end and the taper face of the annulus exerted in the direction of thread axis, with the contact of pressure-applying instrumentality and the taper face increasing progressively in area of contact in the direction of increasing diameter and substantially throughout the length of the taper and with contact between the instrumentality and projected end of the annulus brought into pressure-applying activity after activity on the taper face has commenced and prior to the completion of the progressive increase of contact development on the taper face.

7. An embryo nut formation adapted for the production of a gripping nut, said formation comprising a body and an annulus projected therefrom symmetrical to the thread axis, said body and annulus being integral and having the thread opening threaded throughout the length of the opening with the threads of uniform pitch and depth, said annulus having a tapered peripheral face with the planes of maximum and minimum diameter of the face extending at right angles to the thread axis and spaced apart in parallel relation a distance such that a cross section of the annulus will present such face at an angle to the plane of maximum diameter not materially greater than 45°.

8. An embryo nut formation adapted for the production of a gripping nut, said formation comprising a body and an annulus projected therefrom symmetrical to the thread axis, said body and annulus being integral and having the thread opening threaded throughout the length of the opening with the threads of uniform pitch and depth, said annulus having a tapered peripheral face with the planes of maximum and minimum diameters of the face extending at right angles to the thread axis and spaced apart in parallel relation a distance such that a cross section of the annulus will present such face at an angle to the plane of maximum diameter of approximately 40°.

9. The art of producing gripping nuts, which consists in producing an integral embryo nut formation having a body and projected annulus, with the threads of uniform pitch and depth and with the annulus symmetrically disposed relative to the thread axis, the annulus having a frusto-conical external face with the portion of least diameter away from the body of the formation, a cross-section of the annulus presenting the face at an angle to the plane of maximum diameter not materially greater than 45°, and subjecting the formation to pressure application by a pressure-applying instrumentality having a die face contacting with the external face of the annulus, a cross-section of the die presenting such die face at an angle to the plane of maximum diameter of the annulus different from and less than the angle of the annulus face, with the difference in angularity of the two contacting faces sufficient to produce a progressive increase in the area of contact of the faces as the pressure application develops.

10. A method as in claim 9 characterized in that the die includes a face brought into activity during the period of pressure applying activity, with the face brought into contact with the end of the annulus subsequent to the contact of the angular faces and prior to the completion of the pressure-applying activity.

In testimony whereof I affix my signature in presence of two witnesses.

CHAS. F. WHITMAN.

Witnesses:
  EDW. J. HOPPA,
  J. M. JOHNSON.